United States Patent [19]

Miura et al.

[11] 4,400,076
[45] Aug. 23, 1983

[54] FINGER ABUTMENT DEVICE FOR CAMERA

[75] Inventors: Yuzo Miura, Seki; Makoto Katsuma, Kawasaki; Masayuki Suzuki, Tokyo, all of Japan

[73] Assignee: Canon Kabushiki Kaisha, Tokyo, Japan

[21] Appl. No.: 348,340

[22] Filed: Feb. 12, 1982

[30] Foreign Application Priority Data

Feb. 20, 1981 [JP] Japan ............................. 56-23511[U]

[51] Int. Cl.³ .......................................... G03B 17/00
[52] U.S. Cl. .................................... 354/202; 354/266
[58] Field of Search .................... 354/202, 266, 288

[56] References Cited

U.S. PATENT DOCUMENTS 3,599,548 8/1971 Hennig ............................ 354/266 X
4,324,472 4/1982 Terada et al. ...................... 354/266

Primary Examiner—John Gonzales
Attorney, Agent, or Firm—Toren, McGeady and Stanger

[57] ABSTRACT

In a camera having a shutter-release button and a rapid-winding lever positioned adjacent each other, a finger abutment member is provided as extending from the casing of the shutter-release button to cover the axis portion of the rapid-winding lever.

5 Claims, 16 Drawing Figures

FINGER ABUTMENT DEVICE FOR CAMERA

BACKGROUND OF THE INVENTION

1. Field of the Invention

This invention relates to finger abutment devices for cameras, and more particularly to finger abutment devices for cameras on which the right index finger controlling actuation of the shutter-release button rests.

2. Description of the Prior Art

Figure 1:
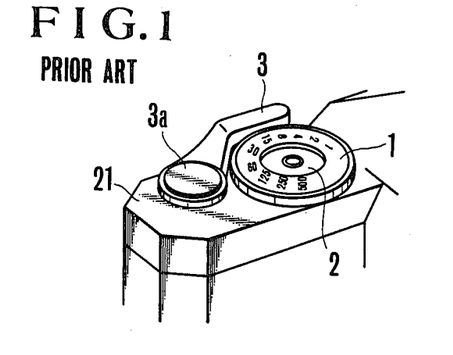
FIGS. 1, 2 and 3 are fragmentary perspective views of cameras having prior art finger abutment devices.
Figure 2:
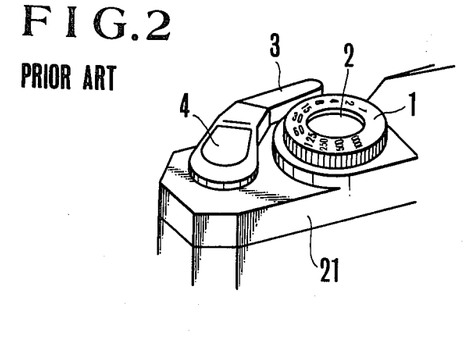
Figure 3:
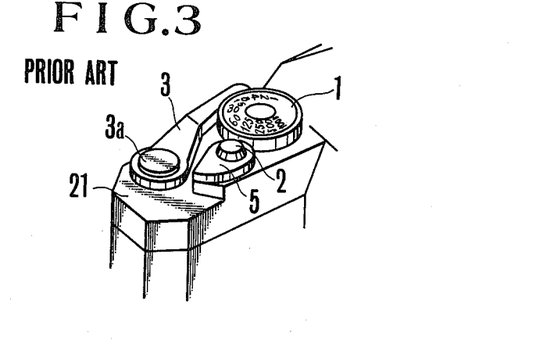

In the past, this sort of finger abutment device was known in the forms illustrated in FIGS. 1 to 3. FIG. 1 exemplifies a selector dial positioned in coaxial relation to the shutter button and increased in size to also serve as the finger abutment, FIG. 2 a large finger abutment pad 4 applied on the axis portion 3a of the winding lever 3, and FIG. 3 a shutter button ring modified with a sideward extension made as the finger abutment. However, these conventional forms all were insufficient in view of the role required for the finger abutment, and they have contributed to poor management of the cameras.

That is, such conventional finger abutments do not allow the photographer holding the camera to rest only the tip portion of the right index finger, and, therefore, the finger is unable to sufficiently stabilize itself. Also, among professional and amateur photographers there is a tendency to concentrate on the shutter button and the viewfield of the finder and there exists a custom that while the index finger is kept in touch on the shutter button, the right thumb against the rapid-winding lever is moved back and forth by a small distance several times to complete one film winding operation. With such a prior art finger abutment, it often happened that the rapid-winding lever was blocked by the index finger during this winding operation. Thus, it is not suited for quick and easy operation. Particularly in a camera in which the light value display is presented by the first stroke of the shutter button, and a shutter release is actuated by the second stroke, to permit the observation of the light value display even when cocking, there was need for keeping the push of the shutter button by the finger, and the above-mentioned inconvenience was unavoidable. Also, in such a camera, striking of the winding lever on the index finger led to a high possibility of an accidental further depression of the shutter button on the second stroke. Thus, the prior art finger abutments have been found to be unsatisfactory.

SUMMARY OF THE INVENTION

With the foregoing in mind, it is an object of the present invention to provide for a camera having a shutter-release button and a rapid-winding lever positioned adjacent to each other a finger abutment device of very simple structure capable of improving the management of the camera.

This and other objects of the invention will become apparent from the following description of embodiments thereof.

DETAILED DESCRIPTION OF THE PREFERRED EMBODIMENTS

The present invention is next described in connection with embodiments thereof by reference to the drawings.

Figure 4:
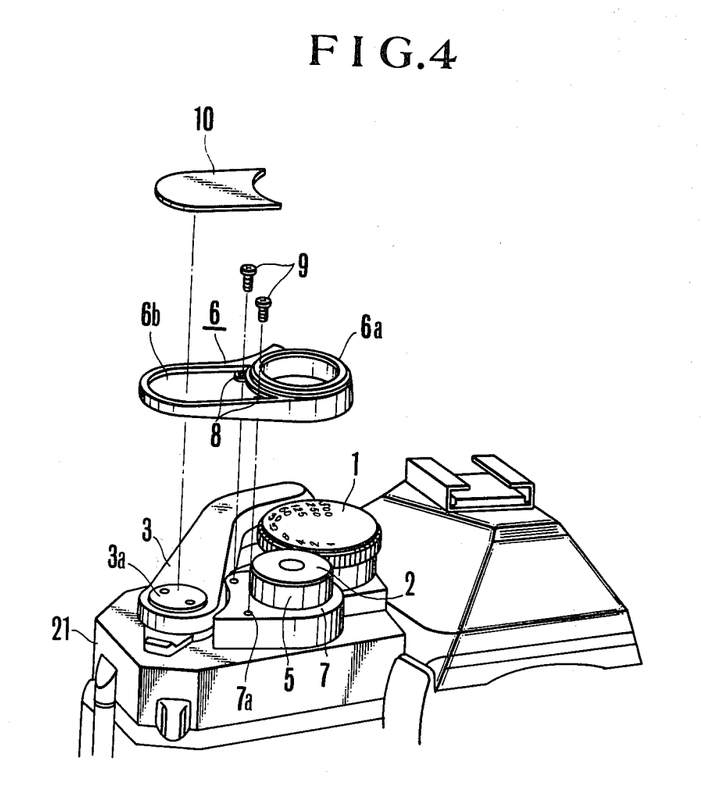
FIG. 4 is an exploded perspective view of one embodiment of a finger abutment device according to the present invention.
Figure 5:
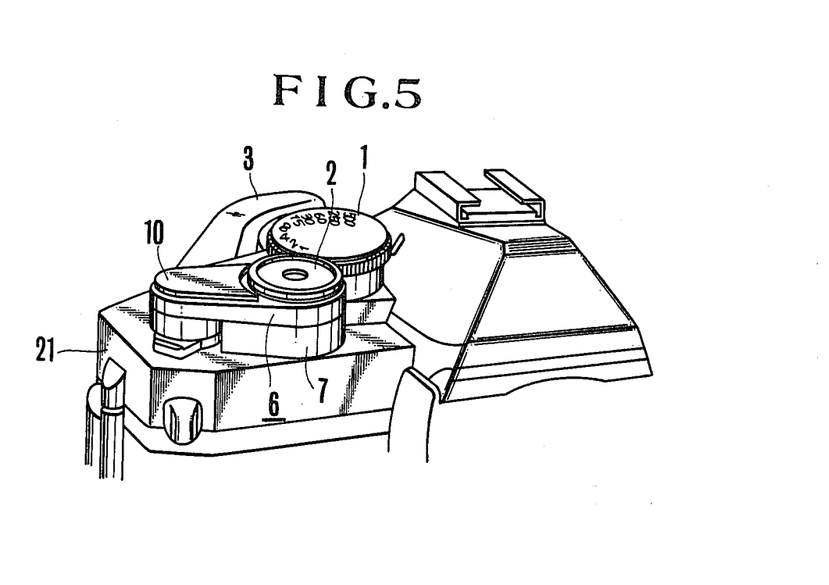
FIG. 5 is a perspective view illustrating the assembled state of the embodiment of FIG. 4.

In FIGS. 4 and 5, a finger abutment 6 comprises a sleeve-like portion 6a fitted on a shutter button ring 5 and covering a collet 7 and a flat portion 6b covering the axis portion 3a of the rapid-winding lever 3. This finger abutment 6 after having been fitted on the shutter button ring 5 is fixed to the collet 7 by screw fasteners 9 extending through respective holes 8 of the aforesaid flat portion 6b into respective threaded holes 7a in the collet 7. Then, a finger abutment pad 10 is mounted so as to seal the heads of the screw fasteners 9. This pad 10 is made of elastic material, for example, rubber, and is shaped to fit the finger when rested thereon. It is noted that the aforesaid finger abutment 6 may be formed in unison with the shutter button ring 5.

Figure 6:
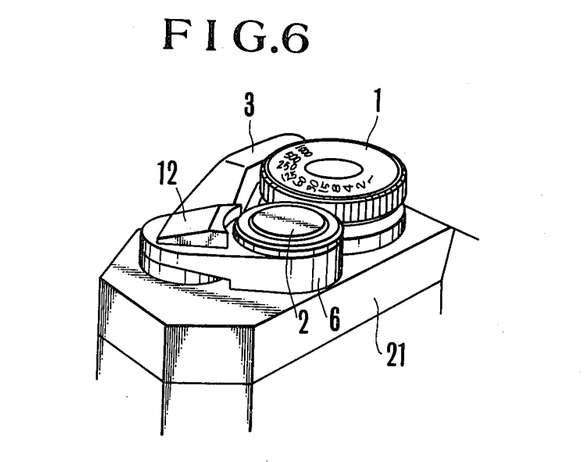
FIG. 6 is a perspective view illustrating another embodiment of the invention.
Figure 7:
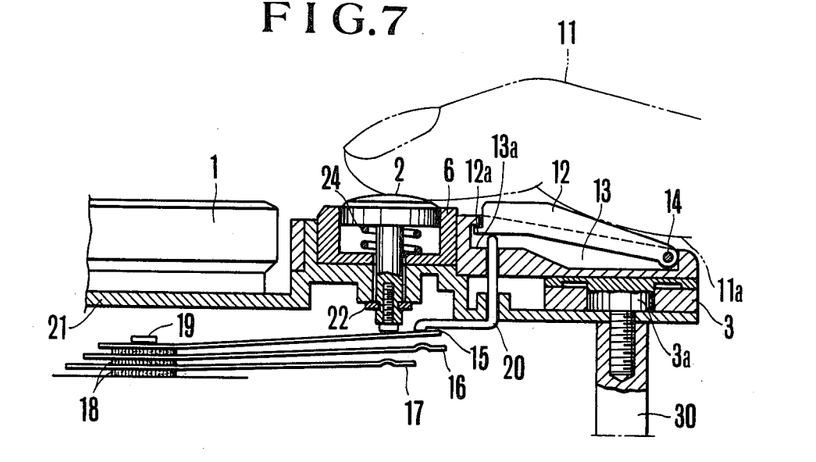
FIGS. 7 and 8 are sectional views illustrating the details of the embodiment of FIG. 6.
Figure 8:
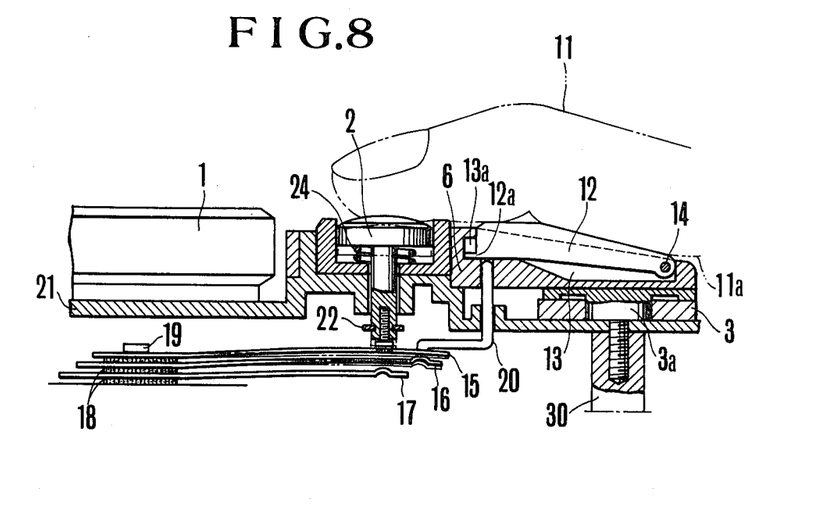

FIGS. 6 to 8 illustrate another embodiment of the invention where that part of the finger abutment which contacts with the part 11a of the finger touching the shutter button is provided with a light value display control switch button 12 (which also serves as the pad 10) actuable by the finger part 11a. That is, the aforesaid switch button 12 is positioned in an upper recessed portion 13 of the finger abutment 6 with its one side pivotally mounted on a shaft 14, the opposite or free end of which has a projected portion 12a fitting in a U-shaped engagement portion 13a within the recessed portion 13 to prevent slipping-off. Three contacts 15 to 17 constitute two switches controlling the opening and closing operation of a shutter release circuit and a light value display circuit (not shown) and are fixed to a framework at one end thereof by a screw fastener 19 through insulators 18. A signal transmission member 20 vertically penetrates an upper panel 21 of the camera housing and the casing of the finger abutment 6 with its top end abutting against the lower surface of the aforesaid light value display switch button 12 and its bottom end riding on the uppermost one 15 of the aforesaid contacts so that the resilient force of this contact 15 urges the button 12 upwards to the illustrated position of FIG. 7. The shutter-release button 2 is lifted upward by a return spring 24 until a stopper 22 abuts against the lower surface of the upper panel 21, and, in this position, the bottom end of the shutter-release button contacts with the aforesaid uppermost contact 15.

During actuation of a shutter release, after the camera has been prepared for an exposure, when the finger tip touches the shutter button 2 as illustrated in FIG. 7, the part 11a of the finger 11 is placed on the finger abutment 6. Then, when the switch button 12 is depressed by the part 11a as illustrated in FIG. 8, the switch button 12 is turned about the pivot shaft 14 in a counterclockwise direction until the projected portion 12a is blocked by the lower shoulder of the U-shaped portion 13a, whereby the signal transmission member 20 is moved downwards while bringing the contact 15 into engagement with the contact 16. Therefore, the exposure value display circuit (not shown) is closed to display whether or not the presetting of the exposure factors are proper in the field of view of the finder. Subsequently thereto the shutter button 2 is pushed down by the finger tip as illustrated by dashed lines in FIG. 8, whereby the contacts 16 and 17 are brought into contact with each other. Therefore the shutter release circuit is closed to effect releasing of the shutter. It is noted that the light value display circuit and shutter release circuit are of various forms known in the art, and their explanation is omitted here.

Figure 9:
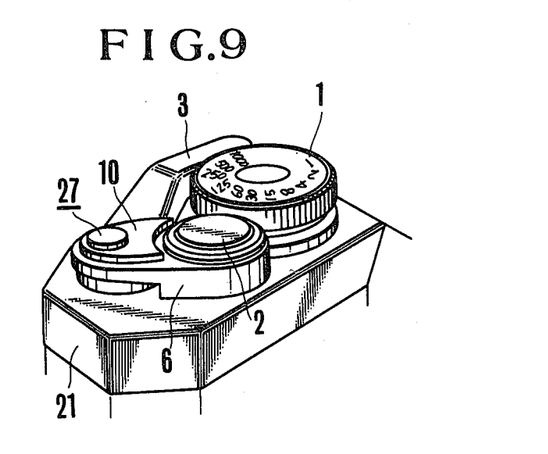
FIG. 9 is a perspective view of still another embodiment of the present invention.
Figure 10:
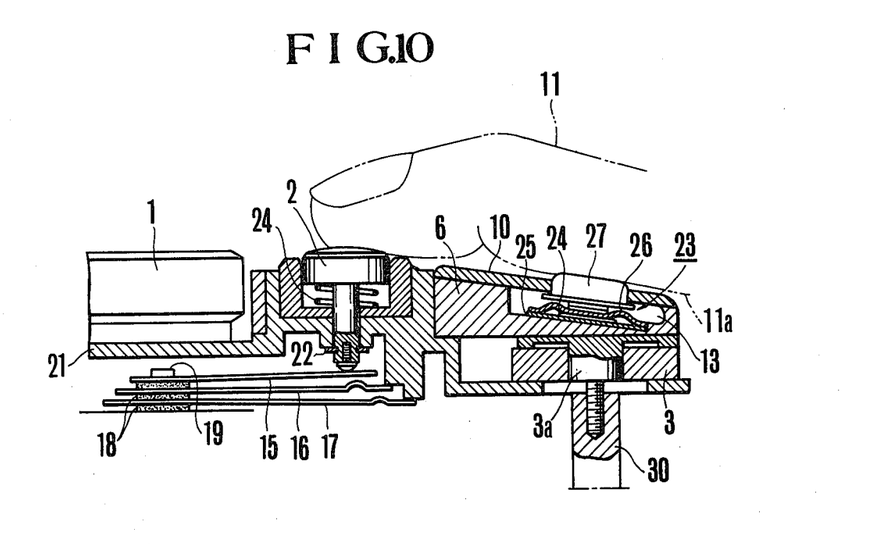
FIG. 10 is a sectional view illustrating the details of the embodiment of FIG. 9.

FIGS. 9 and 10 illustrate still another embodiment of the invention where in addition to the contacts 15 and 16 there is provided another switch 23 connected in parallel with contacts 15 and 16 and arranged independently of the latter within a recessed portion 13 of the finger abutment 6. This light value display switch 23 comprises a switch substrate plate 25 having a switch pattern 24 applied on the upper surface thereof, an electrically conductive rubber roof 26 over the surface of the switch substrate so as not to normally contact with the switch pattern 24, and a switch button 27 positioned on the outer surface of the rubber roof 26.

Using the finger 11 touching the shutter button 2, the switch button 27 is pushed down by finger part 11a, whereby the electrically conductive rubber roof 26 is collapsed against the resilient force thereof and pressed against the switch pattern 24 to close the light value display switch 23 with the presentation of the light value display. Then, similarly to the aforesaid example, the finger tip depresses the shutter button 2, whereby the contacts 16 and 17 are contacted with each other to close the shutter release circuit. In this case, before the contacts 16 and 17 are contacted with each other, the contacts 15 and 16 contact with each other. Therefore, even if the light value display switch 23 is damaged, the light value can be displayed. It is noted that the aforesaid light value switch 23 may be constructed in the form of an electronic touch switch.

Also, instead of the aforesaid light value display switch 23, such position may be occupied by an actuator switch for an automatic focus adjusting device controlling the focusing operation of the objective lens. In this case, when the switch button 27 is depressed by the part 11a of the finger 11, the automatic focus adjusting device is rendered operative. After the camera has been automatically focused on an object to be photographed, the shutter button 2 is then pushed down by the finger tip, whereby the contacts 15 and 16 are contacted with each other to render the light value display circuit operative, and the contacts 16 and 17 are also contacted with each other to render the shutter release circuit operative. That is, if the switch 23 of FIG. 10 is used in actuating the automatic focus adjusting device, it is made possible for only the finger which operates the shutter button to selectively control the focusing operation of the objective lens, the light value display and the shutter release. Further if the light value display and the function (stopping the focus driving motor) of the AF lock are controlled by the contact 15, and 16, it is also possible that the automatic adjusting device is actuated by the switch 23, the light value display and the AF lock are actuated by the first-step depression of the shutter button, and the shutter release operation starts by the second-step depression of the shutter button.

It is noted that as such automatic focus adjusting device in the camera mention may be made of, for example, the preceeding proposal by the applicant of this patent application in Japanese Laid-Open Patent Sho 55-115023 (the corresponding U.S. patent application Ser. No. 121,690, dated Feb. 15, 1980, now U.S. Pat. No. 4,329,033) or Japanese Laid-Open Patent Sho 55-155337 (the corresponding U.S. patent application Ser. No. 150,958, dated May 19, 1980, now abandoned). It is also possible to use any other type of automatic focus adjusting device.

Figure 11:
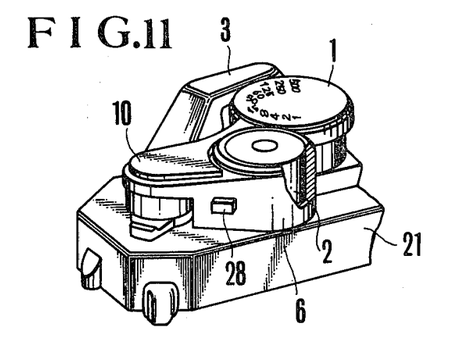
FIGS. 11 and 12 are perspective views of further embodiments of the invention.

FIG. 11 illustrates a further embodiment of the invention where the shutter button ring 5 and the finger abutment 6 are formed as a unit with the provision of a push button 28 in the side wall thereof to changeover a switch incorporated in the interior of the finger abutment. This push button 28 may take the form of a BC button (Battery Check button), AE lock button (by which informations such as aperture value and shutter speed automatically determined at the time of continuous shooting are caused to be stored in the memory circuit), or a step-up button (by which the automatically determined aperture value or shutter speed is corrected one stop or 2 stops).

Figure 12:
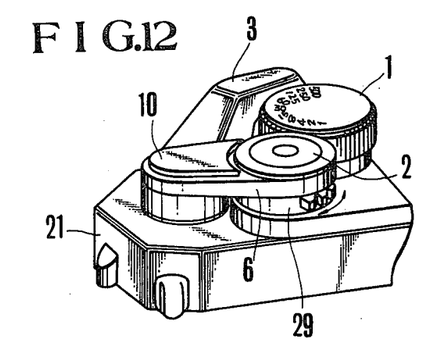
Figure 13:
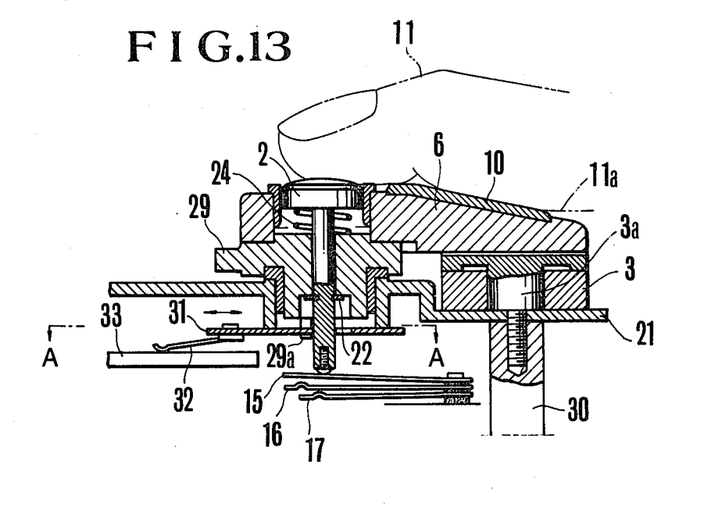
FIG. 13 is a sectional view illustrating the details of the embodiment of FIG. 12.
Figure 14:
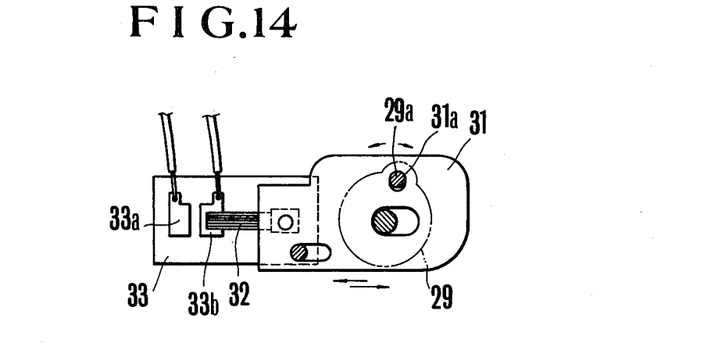
FIG. 14 is a sectional view taken along A—A cross-sectional plane of FIG. 13.

FIGS. 12 to 14 illustrate a furthermore embodiment of the invention where in the lower portion of the finger abutment 6 there is provided a rockable member 29 for changing over a priority mode selector switch. This rockable member 29 has a rod 29a engaging in a hole 31a of a switch plate 31, so that rocking movement of the member 29 is converted to linear movement of the switch plate 31 to either of the left and right. The switch plate 31 bears a slider brush 32 slidingly movable on a substrate 33. This slider brush 32 is taken out of ground. Formed on the substrate 33 is a priority mode changeover pattern 33a and 33b with the patterns 33a and 33b being connected to an exposure control circuit so as to represent the shutter speed priority mode and aperture priority mode respectively. It is easy to modify the pattern so as to permit the selection of a program AE, or manual exposure mode.

When the switch plate 31 is moved to the right or left by the rockable actuator 29, as the slider brush 32 rides either on the patch 33a or the patch 33b, the desired one of the modes can be electrically selected.

Figure 15:
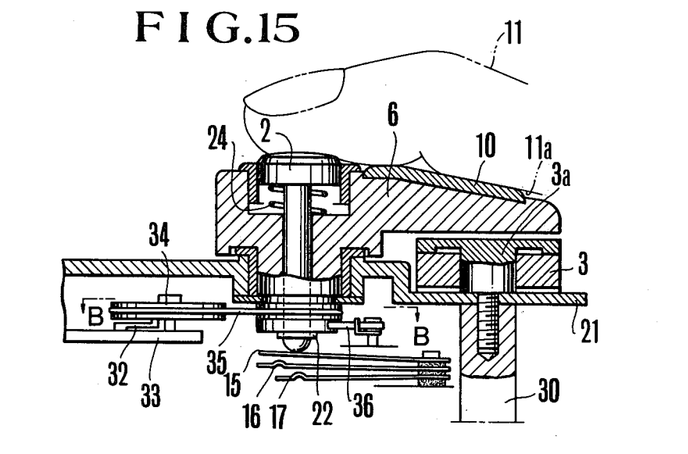
FIG. 15 is a sectional view of a further embodiment of the invention.
Figure 16:
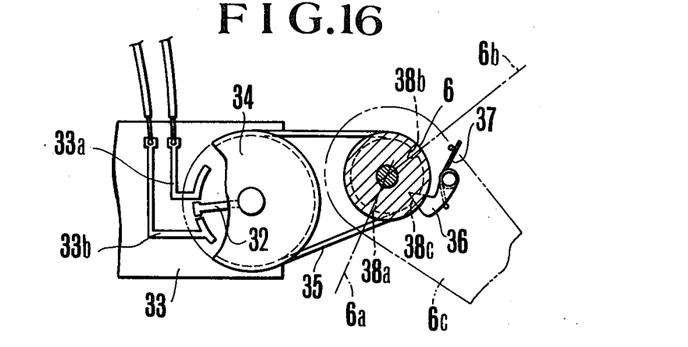
FIG. 16 is a sectional view taken along B—B cross-sectional plane of FIG. 15.

FIGS. 15 and 16 illustrate a furthermore embodiment of the invention where the finger abutment 6 and the release button ring are formed as a unit, and the finger abutment 6 is made rockable about the shutter button 2 as its part is engaged in the upper panel 21. This finger abutment is drivingly connected through an endless belt 35 to a mode selector disc 34 which is rotatably mounted on the substrate. The mode selector disc 34 has a slider brush 32 grounded and slidingly movable on the substrate 33.

When it is desired to change over between the modes, the operator needs to turn the finger abutment 6 to either one of three positions indicated by dashed lines 6c, 6b and 6a in FIG. 16, whereby the slider brush 32 is moved by the belt 35 to either one of a blank area, the patch 33b and the patch 33a representing battery OFF, battery ON and self-timer exposure modes respectively. 36 is a lock pawl for holding the finger abutment in each mode changed over position always urged by a spring 37 to be pressed against the periphery of the finger abutment 6 in engagement with one of detent notches 38a, 38b and 38c formed therein.

As has been described above, the present invention is to provide a finger abutment in a form extending from the casing of the shutter button to cover the axis portion of the rapid-winding lever, and, therefore, has the following advantages:

(1) The heads of the screw fasteners by which the rapid-winding lever is fixed to the drive shaft can be hidden.

(2) When holding the camera, as the shutter button control finger rests more stably than the conventional camera, the photographer psychologically feels a greater sense of security. Particularly with the camera held in the vertical position, its effect is significant.

(3) Even in a case where while the right index finger is not kept off the shutter-release button, the rapid-winding lever is cocked bit by bit, there is no possibility of occurrence of the rapid-winding lever striking the index finger as it turns, thus achieving the possibility of improving the management of the camera.

Also if the finger abutment is formed in unison with the shutter button ring, it becomes possible to reduce the production cost and to get a uniformly improved appearance from the design standpoint.

The provision of a switch button for controlling the actuation of a light value display or automatic focus adjusting device in that portion of the finger abutment which contacts with the inner part of the finger touching the shutter release button gives rise to the following additional advantages in addition to those previously mentioned.

(4) When the camera is placed in its shooting position, mere placement of the right index finger to the shutter release button operates to automatically close the light meter control switch or the automatic focus adjusting device actuating switch so that the light value is displayed or the focusing operation of the objective lens is carried out. Because the management is so much improved and as the photographer is allowed to concentrate his attention on an object to be photographed, opportunities to achieve good photographs will not be lost.

(5) In a case where the shutter-release button is arranged to move downwards in two steps for selective control of the light value display and the actuation of a shutter release, since the strokes and the pressures for assuring the ON positions of the light value display switch and the release switch tend to be different from each other, the prior art device has a drawback that despite the intention of closing only the light value display switch, the release switch too is accidentally closed. According to the present invention, such drawback is never encountered.

The arrangement of a switch on the finger abutment or in the lower part thereof permits the operation of the switch to be controlled by the right second finger while the index finger is kept in touch on the shutter button, thus contributing to an improvement of the manageability of the camera. Further, the finger abutment itself is made to serve as a switch actuating member. Therefore, it is made possible not only at a glance to discriminate the selector position but also without looking at it to recognize it only by touching with the finger.

While specific embodiments of the invention have been shown and described in detail to illustrate the application of the inventive principles, it will be understood that the invention may be embodied otherwise without departing from such principles.

What is claimed is:

1. A finger abutment device for a camera having a shutter-release button and a rapid-winding lever positioned adjacent to each other, comprising a finger abutment member extending from the mount position of said shutter-release button to cover the axis portion of the rapid-winding lever.

2. A device according to claim 1, wherein said finger abutment member has an elastic member fixedly mounted on that part thereof on which the inner part of a finger touching the shutter-release button rests.

3. A device according to claim 1, wherein said finger abutment member is provided with an actuating member for a switch controlling the operation of the camera in that part thereof on which the inner part of a finger touching the shutter-release button rests.

4. A device according to claim 1, wherein said finger abutment member is in the form of a covering surrounding the shutter-release button.

5. A device according to claim 1, wherein said finger abutment is arranged to be rotatable about the shutter-release button, and wherein this rotative movement of the finger abutment member changes over a switch for controlling the camera operation.

* * * * *